United States Patent [19]

Rinnooy Kan

[11] Patent Number: 4,564,272

[45] Date of Patent: Jan. 14, 1986

[54] EYEGLASSES WITH INTERCHANGEABLE PARTS

[76] Inventor: Edmond A. Rinnooy Kan, 53 Mercer St., New York, N.Y. 10013

[21] Appl. No.: 476,540

[22] Filed: Mar. 18, 1983

[51] Int. Cl.$^4$ .............................................. G02C 5/16
[52] U.S. Cl. ..................................... 351/153; 351/116
[58] Field of Search .............. 351/114, 116, 117, 153, 351/115, 118, 121, 111, 110; 16/228

[56] References Cited

U.S. PATENT DOCUMENTS 3,846,017  11/1974  Ferrell ................................. 351/153
4,029,403  6/1977  Harris .................................. 351/116

FOREIGN PATENT DOCUMENTS

WO81/01749  6/1981  PCT Int'l Appl. ................. 351/111

Primary Examiner—Rodney B. Bovernick
Assistant Examiner—P. M. Dzierzynski
Attorney, Agent, or Firm—Kane, Dalsimer, Kane, Sullivan and Kurucz

[57] ABSTRACT

Eyeglasses have a quick disconnect unit including temples insertable through apertures in the frame and detachably affixed thereto by a sleeve mounted on the portion of the temple extending beyond the frame. Earpieces could be detachably maintained to the stem part of the temple by a mated sleeve connection. A temple to frame hinge is provided by a flexible tubular material.

6 Claims, 7 Drawing Figures

EYEGLASSES WITH INTERCHANGEABLE PARTS

BACKGROUND OF THE INVENTION

This invention pertains to eyeglasses having a quick disconnect unit to interchange temples and earpieces, and also having a flexible tube hinge connecting the temples to the frame.

In the eyeglass art various means for affixing temple to frame have been utilized. Conventional eyeglasses commonly use a small screw to fasten the temple to the frame and to operate as a hinge. This method provides a rigid hinge, allows temple rotation about the hinge, and allows removal of the temple from the frame, by the user, with the aid of an appropriate screwdriver.

Rivet type pins have also been used to affix eyeglass temples to frames. The rivet pins also operate as rigid hinges and generally are not removable by the user. A chain link temple fastened to the frame by the coupling of a closed link in the chain to a closed loop on the frame has also been used, e.g. U.S. Pat. No. 4,153,346. Traditionally temple to frame affixing means have been of the permanent or semi-permanent type.

Permanently affixed and screw attached temples to frames are not suited to interchangeability of temples and earpieces. Screw attachments require an appropriate tool and a requisite amount of care disconnecting the temple from the frame. Temples are generally fitted to a particular frame and not suited for interchangeability due, among other things, to the precision fit of the screw hinge. Additionally the above described eyeglasses are not adaptable to different clothing styles or to allow the addition of ornamental pieces. When a broken temple occurs in using eyeglasses having permanently or semi-permanently attached temples, purchase of a new frame with temples attached is often the only means of replacement available to the wearer.

A conventional rigid hinge is an inherently high stress area in conventional eyeglasswear and, as such, many breaks in eyeglass frames occur at the hinge. Additionally the wearer of eyeglasses having rigidly hinged temples may experience discomfort during physical activity due to the temples' limited movement capacity.

As can be seen, the above described eyeglasswear is not conducive to interchangeability of parts and generally utilizes a rigid temple to frame hinge.

SUMMARY OF THE INVENTION

This invention involves eyeglasses having a quick disconnect unit wherein a temple may be disconnected from the frame manually and subsequently reattached manually.

The primary object of the present invention is to provide eyeglasses having parts that are quickly and easily interchangeable by the wearer.

Another object of the present invention is to provide a unique pair of eyeglasses adaptable to various clothing styles with the capability of hanging pendants and ornaments therefrom.

A further object of the present invention is to provide the means for satisfying all of an eyeglass wearer's fashion needs in an economic and convenient manner whether or not for prescription purposes.

A still further object of the present invention is to provide a unique flexible hinge, allowing three dimensional movement of the temple, which flexes and provides comfort to the wearer especially during physical activity.

Another object of the present invention is to reduce eyeglass breaks at the hinge and to reduce replacement costs in the event of a broken temple.

Still another object is to provide an eyeglass construction that permits the parts to be supplied and marketed in a disassembled form for subsequent and relatively easy consumer assembly thereby minimizing production time, labor and cost and, at the same time, avoiding the necessity of expensive packaging for protection of an otherwise fragile assembled product.

In accordance with a disclosed embodiment the temples include a rod which is removably inserted through an aperture in the frame and which extends beyond the plane of the frame, and a sleeve which is demountably attached to the portion of the rod that extends beyond the plane of the frame so that the sleeve detachably maintains the temple to the frame.

Alternately the quick disconnect unit may include a substantially cylindrical bar having at least one stud which is connected to the stem and shaped to be matingly inserted through the aperture in the frame so that upon rotation of the bar the stud(s) of the studded bar may be aligned to abut the frame and to inhibit movement of the bar with respect to the frame along the axis of the temple.

An earpiece disconnect unit is also provided wherein the interchangeable earpieces may be disconnected from the stem manually and subsequently reattached manually. This may be accomplished by the earpiece with a sleeve on one end into which the end of the stem is matingly inserted.

A flexible connector operating as a temple to frame hinge is also provided.

Other objects and advantages will become apparent from the following detailed description which is to be taken in conjunction with the accompanying drawings.

DETAILED DESCRIPTION OF THE PREFERRED EMBODIMENT

Figure 1:
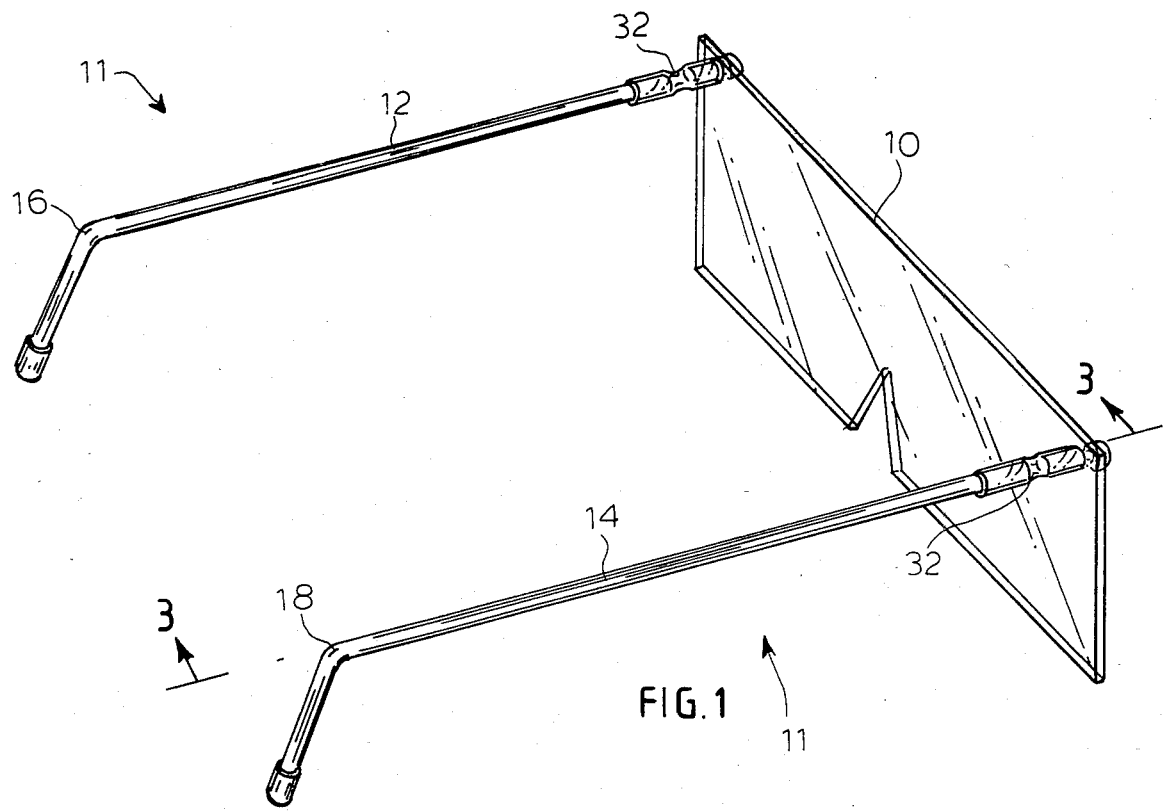
FIG. 1 is a perspective view of the eyeglasses incorporating the teaching of the present invention.
Figure 4:
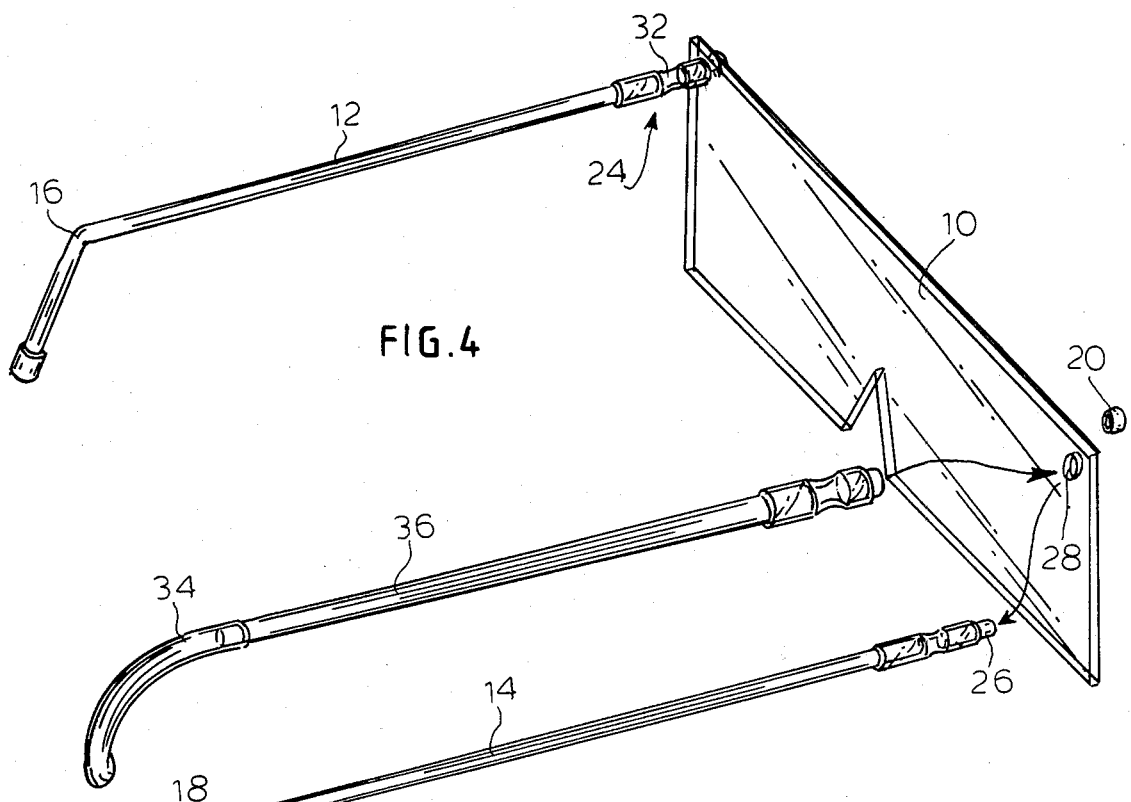
FIG. 4 is a perspective view of the eyeglasses having one temple disconnected from the frame and a substitute therefor.
Figure 5:
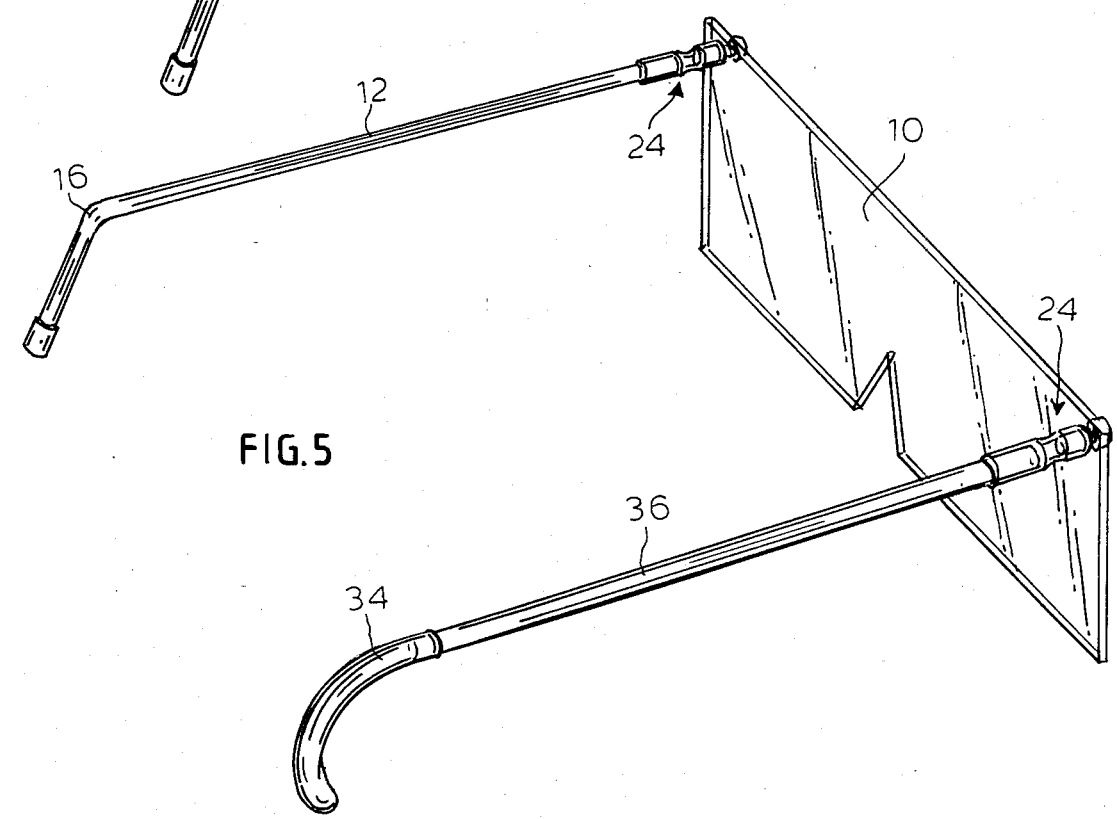
FIG. 5 is a perspective view of the present invention having an alternate temple with different earpiece.

In FIG. 1, temples 12 and 14 are shown detachably connected to frame 10. Any suitable frame having at least one aperture 28 (FIG. 4) may be used. In a contemplated embodiment both left and right sides of frame 10 will contain apertures 28. The temples are comprised of integral earpieces 16 and 18. Alternately removable and interchangeable earpieces are also contemplated as shown in FIGS. 4 and 5.

Figure 2:
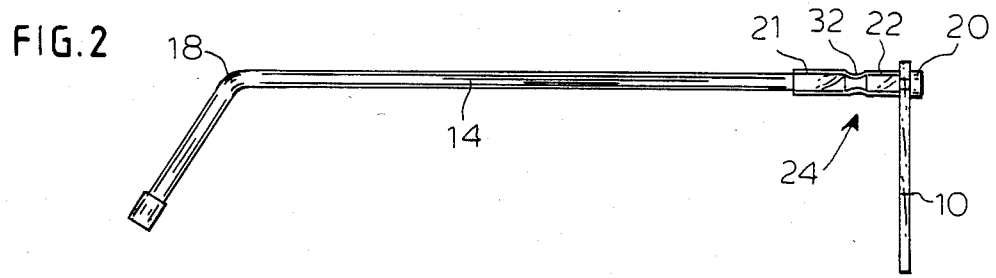
FIG. 2 is a side view of the present invention taken along line 3—3 of FIG. 1.
Figure 6:
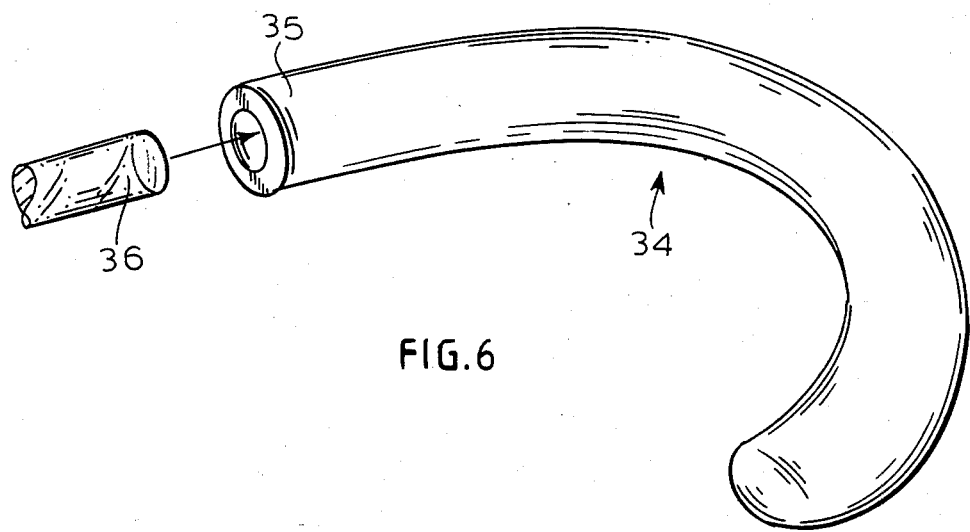
FIG. 6 is a perspective view of a stem end and an earpiece disconnected therefrom, illustrating the earpiece quick disconnect unit.

As shown in FIGS. 1 and 2, and in detail in FIG. 6, the eyeglasses of the present invention include a removable earpiece 34 which has a sleeve part 35 into which stem end 36 is matingly inserted, thereby detachably securing earpiece 34 to stem end 36. The friction force between stem end 36 and sleeve part 35 must be sufficient to resist withdrawal of stem end 36 from sleeve part 35 during normal use and, at the same time, allow for easy detachability if desired. A sleeve part 35 composed of a material having elastic properties providing for appropriate friction, as for example, a flexible plastic such as polyvinyl or rubber tubing, is readily adapted to such use. The portion of earpiece 34 not acting as a sleeve may be composed of any material of suitable cosmetic and decorative appearance and comfort to the wearer. Affixed to the earpieces are stems 12 and 14 which are preferably rigid and may be composed of any suitable rigid material, preferably a plastic (e.g. polymeric tubing) or plexiglass.

Figure 3:
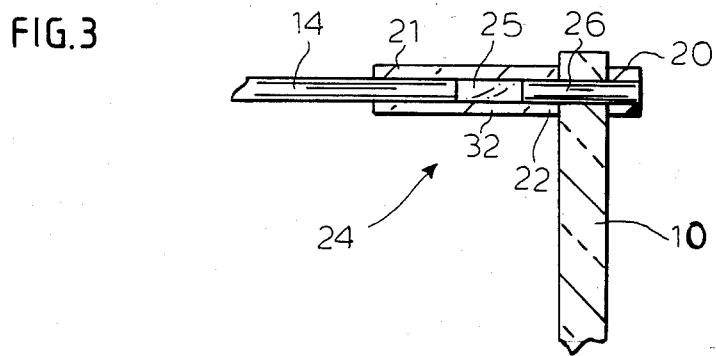
FIG. 3 is a partial side view illustrating the quick disconnect unit of the present invention wherein the temple is connected to the frame.

As illustrated in FIG. 2, flexible connector 24 comprises stem attachment 21, flexible hinge 32 and seat 22. Stem connecting part 21 of flexible connector 24 matingly overlaps stem 12 and is permanently attached thereto. This may be accomplished by any conventional means e.g. glueing or heat treatment. Flexible connector 24 may be composed of any suitable plastic or rubber, e.g. polyvinyl tubing. As illustrated in FIG. 3, in a preferred embodiment, flexible hinge 32 will contain a hollow portion 25 to facilitate the operation of flexible hinge 32. A seat portion 22 of flexible connector 24 matingly overlaps rod 26 and may be permanently affixed thereto. This may be accomplished by any conventional means e.g. glueing or heat treatment. The seat portion 22 abuts the frame 10 and prevents frame displacement axially along the temple. Rod 26 is composed of a rigid material such as a rigid transparent plastic. It is formed to be closely fitted to aperture 28. Rod 26 is matingly inserted through aperture 28 (FIG. 4) so that a portion of rod 26 extends beyond the plane of frame 10, preferably approximately 1/10 inch (2.54 mm) beyond the plane of frame 10. Sleeve 20 is detachably mounted on rod 26 preventing withdrawal of rod 26 from aperture 28 during normal eyeglass use. Sleeve 20 should be sized so as to be capable, firstly, of being slidably mounted onto rod 26, and, secondly, so as to apply frictional force to rod 26 so that the sleeve to rod friction is sufficient to enable sleeve 20 to remain removably attached and to prevent movement of the frame axially with respect to the temple during normal eyeglass use. Sleeve 20 may be composed of any suitable material having sufficient elastic properties to apply a gripping force or pressure the rod 26 when somewhat radially stretched and slidably mounted thereon. A section of elastic plastic tubing is particularly adaptable to such use.

Figure 7:
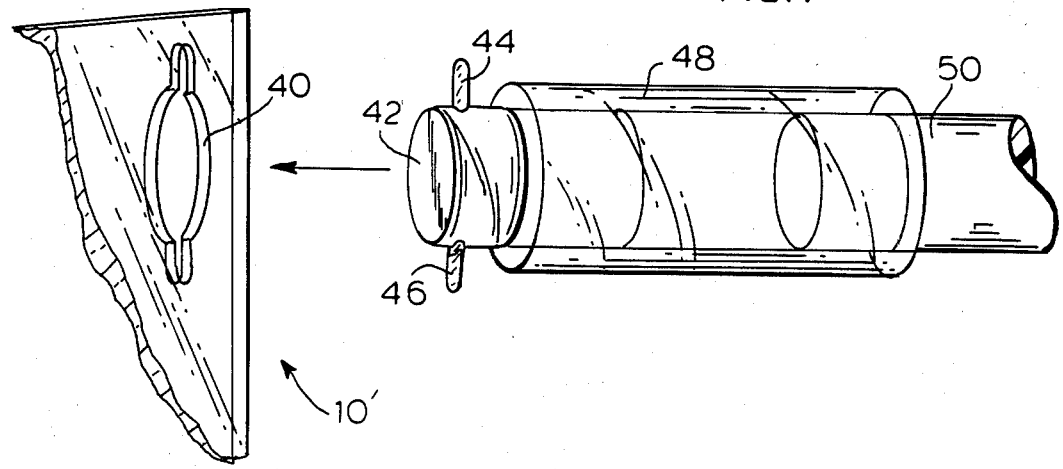
FIG. 7 is a perspective view of an alternate temple to frame quick disconnect unit.

In FIG. 7 an alternate embodiment of the quick disconnect unit is shown. Aperture 40 is shaped to matingly receive studded bar 42. Studded bar 42 must have at least one stud attached thereto, and as shown bar 42 may include studs 44 and 46. Tubing 48 providing a flexible hinge may be connected to temple 50 which may or may not have a detachable earpiece. When studded bar 42 is matingly inserted through aperture 40 it is then rotated so that the studs 44 and 46 of studded bar 42 are aligned to abut the frame and to inhibit movement of the bar with respect to the frame along the axis of the temple. Studded bar 42 and studs 44 and 46 may be comprised of any material of sufficient rigidity to supply support to the temple during use.

Although a preferred embodiment of the invention has been disclosed and described in detail herein it should be noted that the invention is in no sense limited thereby and its scope is to be determined by that of the appended claims. In this connection, and alternately, a rod or stud may extend from the frame 10 and a sleeve or other member on the end of the temple or the temple itself having a mating aperture may receive and couple or grip the stud for providing the quick disconnect. Obviously, frame 10 can readily to replaced by another frane of different configuration or design or prescription at the selection and option of the wearer.

What is claimed is:

1. Eyeglasses having parts that are quickly and easily interchangeable comprising:
    a lens frame
    a left temple piece comprising a stem portion attached to a left side of the lens frame and a right temple piece comprising a stem portion attached to a right side of the lens frame,
    means for detachably maintaining each temple piece to the lens frame, so that by manually pulling each temple piece the temple piece is detached from its connection with the lens frame and a subsequent manual application of force may be used to reattach each temple piece to the lens frame wherein the means for detachably maintaining each temple end to the lens frame comprises:
    a seat means connected to the temple, and abutting the frame, a rod connected to the seat means and extending through an aperture in the frame and beyond the plane of the frame; and an elastic sleeve friction fitted to the portion of the rod that extends beyond the plane of the frame so that the sleeve abuts the frame, and so that the sleeve is detachably maintained to the rod.

2. The invention in accordance with claim 1 wherein:
    the frame has at least one aperture; and
    at least one temple piece further comprises: a rod slidably inserted through the aperture in the frame and adapted to be quickly and easily removed manually.

3. The invention in accordance with claim 2 comprising:
    an earpiece slidably connected to a rearward end of the temple piece and adapted to be quickly and easily removed manually.

4. The invention in accordance with claim 3 wherein:
    the seat is connected to the stem by a flexible connector operating as a hinge.

5. The invention in accordance with claim 1 comprising:
    a flexible connector composed of a flexible material which is attached to the means for affixing the temple to the frame, and operated as a hinge.

6. Eyeglasses having parts that are quickly and easily interchangeable comprising:
    a lens frame
    a left temple piece comprising a stem portion attached to a left side of the lens frame and a right temple piece comprising a stem portion attached to a right side of the lens frame,
    means for detachably maintaining each temple piece to the lens frame, so that each temple piece is detached from its connection with the lens frame manually, and a subsequent manual application of force is used to reattach each temple piece to the lens frame wherein the means for detachably maintaining each temple piece to the lens frame comprises:

a seat means connected to each temple and abutting the frame; a first aperture located on a left side of the lens frame and a second aperture located on a right side of the lens frame, the first and second apertures each having a central opening for receiving a temple, and having at least two stud shaped openings extending therefrom for receiving studs, the temples further comprising at least two studs on an end thereof, the studs extending substantially perpendi-cularly therefrom; and wherein the left and right temples are inserted into apertures one and two respectively and rotated so that the studs no longer align with the stud shaped openings.

* * * * *